3,509,134
CARBAMATES OF 11-HYDROXY-10,5(IMINOMETH-
ANO)DIBENZOCYCLOHEPTEN-13-ONES AND IN-
TERMEDIATES THEREOF
Martin A. Davis, Montreal, Quebec, and Thomas A. Dobson, St. Laurent, Quebec, Canada, assignors to American Home Products Corporation, New York, N.Y., a corporation of Delaware
No Drawing. Filed Feb. 8, 1967, Ser. No. 614,548
Int. Cl. C07d 41/08
U.S. Cl. 260—239.3                              3 Claims

ABSTRACT OF THE DISCLOSURE

There are disclosed herein the compounds 11-carbamoyloxy-12-methyl-10,5(iminomethanol) - 10,11 - dihydro-5H-dibenzo[a,d]-cyclohepten - 13 - one, as well as the corresponding 11 - N - methyl, 11-N,N-dimethyl, 11-N-ethyl, 11-N-propyl, 11-N-benzyl, 11 - N - p - chlorophenethyl-, carbomayloxy-12-methyl, 12-ethyl, 12-propyl, 12-butyl, 12-amyl, 12-allyl, 12-benzyl, 12-phenethyl, and 12-(3,4,5 - trimethoxy)phenethyl - 10,5 - (iminomethano)-10,11 - dihydro - 5H - dibenzo[a,d]cyclohepten-5-ones, and the corresponding 11-pyrrolidino-, 11-piperidino-, 11-morpholino-, and 11 - N' - ethylpiperazino carbonyloxy-12-methyl, 12-ethyl, 12-propyl, 12-butyl, 12-amyl, 12-allyl, 12-benzyl, 12-phenethyl, and 12 - (3,4,5 - trimethoxy)-phenethyl - 10,5(iminomethano) - 10,11-dihydro-5H-dibenzo[a,d]cyclohepten-5-ones. The compounds are useful as trichomonicidal, antibacterial and anti-inflammatory agents.

This invention relates to novel chemical compounds having useful biological properties. More particularly, this invention relates to novel carbamates of 11-hydroxy-10,5-(iminomethano)-dibenzocyclohepten-13-ones of the following Formula I:

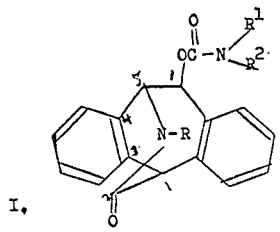

wherein R represents a lower alkyl group containing from 1 to 6 carbon atoms, or an aralkyl or substituted aralkyl group containing from 7 to 11 carbon atoms, such as, for example, the benzyl, phenethyl, phenylpropyl, or trimethoxyphenethyl, group and $R^1$ and $R^2$ represent hydrogen, lower alkyl, containing from 1 to 4 carbon atoms, aralkyl, or substituted aralkyl, or the grouping $NR^1R^2$ taken together may represent a heterocyclic ring optionally containing an additional hetero atom, and containing from 4 to 6 carbon atoms, and from 1 to 2 hetero atoms; exemplary of such heterocycles are the pyrrolidino, piperidino, mopholino, and N'-ethylpiperazino rings.

The novel compounds of Formula I may be secured from the corresponding 11-hydroxy-12-substituted -10,5-(iminomethano)-10,11-dihydro - 5H - dibenzo[a,d]cyclohepten-13-ones of Formula II, wherein R is as defined above, by treatment with an aryl chloroformate, preferably phenyl chloroformate, in the presence of an acid-binding reagent, preferably an organic amine such as, for example, pyridine. This serves to furnish an 11-aryloxycarbonyloxy - 12 - substituted-10,5(iminomethano)-10,11 - dihydro - 5H-dibenzo[a,d]cyclohepten-13-one of Formula III, wherein R is as defined above. This intermediate phenylcarbonate ester is then treated with ammonia or an organic amine of the Formula $R^1R^2NH$, wherein $R^1$ and $R^2$ are as defined above. The reaction may be conveniently carried out in the presence of an inert solvent such as, for example, anhydrous ether or tetrahydrofuran, at a temperature of from −30 to 50° C., and furnishes the desired carbamate ester of Formula I. This general procedure for the conversion of alcohols to their corresponding carbamates and substituted carbamates has been described by W. M. McLamore et al. in J. Org. Chem., 20, 1379 (1955).

The requisite starting materials, viz., the 11-hydroxy-12-substituted-10,5(iminomethano)10,11 - dihydro - 5H-dibenzo[a,d]-cyclohepten - 13 - ones of Formula II, are conveniently prepared as disclosed in our copending U.S. patent application S.N. 552,387 filed May 24, 1966, now U.S. Patent No. 3,426,015. Briefly, this process involves the addition of one molar proportion of bromine to a solution, in an inert solvent, of 5H-dibenzo[a,d]cycloheptene-5-carboxamide, prepared as described by M. A. Davis et al. in J. Med. Chem. 7, 88 (1964). The intermediate bromo compound thus produced is heated in a boiling alkanol or water thus giving 11 - bromo - 10,5-(epoxymethano) - 10,11 - dihydro-5H-dibenzo[a,d]cyclohepten-13-one. This, in turn, is then heated with an excess of an organic amine of the Formula $RNH_2$, wherein R is as defined above, at elevated temperatures within the range of 100–150° C., thus furnishing the desired compounds of Formula II.

The novel compounds of Formula I of this invention have useful biological properties and are of value as medicaments. In particular, they have activity against the parasitic organism Trichomonas vaginalis and are tridomonacidal agents. For this purpose they may be formulated with suitable excipients as vaginal inserts or vaginal suppositories each containing from 50 to 500 mg. of the active ingredient, and may be administered twice to four times daily, for periods of time of from two to four weeks. In addition, the compounds have activity against a number of gram-positive and gram-negative microorganisms and are antibacterial agents. They are effective against certain gram-positive and gram-negative organisms, such as, for example, Staphylococcus pyogenes (both penicillin-sensitive and penicillin-resistant strains), Sarcina luter, Streptococcus faecalis, Echerichia coli, Aerobacter aerogenes, Salmonella pullorum, Pseudomonas aeruginosa, Proteus mirabilis, and Proteus vulgaris. They may be administered topically to the skin in the form of lotions, ointments or creams containing suitable excipients and from 0.1 to 1% of the active ingredient. The compounds also have activity against the parasitic organism horse strongyles and are anthelmintic agents. Furthermore, the compounds have anti-inflammatory action, and are anti-inflammatory agents which may be used topically as described above.

The following formulae and descriptive examples will

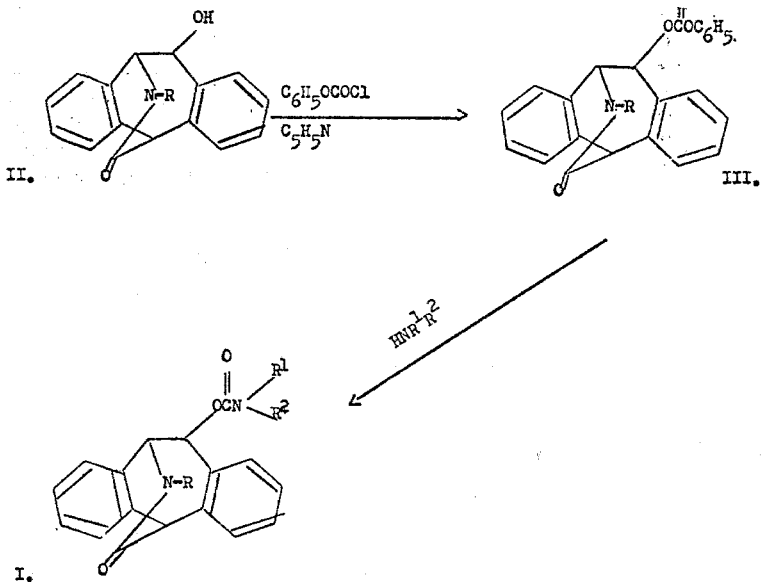

EXAMPLE 1

11 - phenyoxycarbonyloxy-12-methyl-10,5(iminomethano) 10,11 - dihydro - 5H - dibenzo[a,d]cyclohepten-13-one (III, R=CH₃)

A solution of 11-hydroxy-12-methyl-10,5(iminomethano) - 10,11 - dihydro-5H-dibenzo[a,d]cyclohepten-13-one (5.0 g., 0.02 mole) and phenyl chloroformate (4.3 g., 0.027 mole) in dry pyridine (50 ml.) is heated under reflux for 18 hours. The cooled solution is added to water and extracted with benzene. The organic layer is, in turn, extracted with 10% hydrochloric acid followed by water, and is then dried and concentrated in vacuo. The residual material is recrystallized from ethanol to furnish 3.4 g. of the title product with M.P. 183–185° C. Elemental analysis confirms the empirical formula $C_{24}H_{19}NO_4$.

In a similar manner to that described above, but substituting the 11-hydroxy-12-methyl-10,5(iminomethano)-10,11-dihydro-5H-dibenzo[a,d]cyclohepten-13-one, by 11-hydroxy-12-ethyl, 11-hydroxy-12-propyl, 11-hydroxy-12-butyl, 11 - hydroxy - 12 - amyl, 11 - hydroxy - 12 - allyl, 11 - hydroxy - 12 - benzyl, 11 - hydroxy - 12 - phenethyl, or 11 - hydroxy - 12(3,4, 5 - trimethoxy)phenethyl-10,5(iminomethano) - 10,11 - dihydro - 5H-dibenzo[a,d]cyclohepten - 13-ones, the corresponding 11-phenoxycarbonyloxy-12-ethyl, 12-propyl, 12-butyl, 12-amyl, 12-allyl, 12 - benzyl, 12-phenethyl, or 12-(3,4,5-trimethoxyphenethyl)10,5 - (iminomethano) - 10,11-dihydro-5H-dibenzo[a,d]cyclohepten-13-ones are obtained.

EXAMPLE 2

11 - carbamoyloxy - 12-methyl-10,5-(iminomethano)-10, 11 - dihydro - 5H-dibenzo[a,d]cyclohepten-13-one (I, R=CH₃, R¹=R²=H)

A suspension of 11-phenoxycarbonyloxy-12-methyl-10, 5 - (iminomethano)-10,11-dihydro-5H-dibenzo[a,d]cyclohepten-13-one, prepared as described in Example 1 (3.4 g.), in dry ether (150 ml.), is treated wtih liquid ammonia (50 ml.). The mixture is allowed to stand at ambient temperature for two hours and the precipitated product is collected by filtration. Recrystallization from dioxane furnishes the title product with M.P. 235–236° C. An analytical sample is obtained on further recrystallization from the same solvent and has M.P. 238–240° C. The empirical formula $C_{18}H_{16}N_2O_3$ is confirmed by elements analysis.

In a similar manner to that described above, but substituting the 11 - phenoxycarbonyloxy - 12 - methyl - 10,5- (iminomethano) - 10,11 - dihydro-5H-dibenzo[a,d]cyclohepten-13-one by the corresponding 11-phenoxycarbonyloxy-12-ethyl, 11-phenocarbonyloxy - 12 - propyl, 11-phenoxycarbonyloxy - 12 - butyl, 11-phenoxycarbonyloxy-12-amyl, 11-phenoxycarbonyloxy - 12 - allyl, 11-phenoxycarbonyloxy-12-benzyl, 11-phenoxycarbonyloxy-12-phenethyl, or 11-phenoxycarbonyloxy-12(3,4,5-trimethoxy)-phenethyl-10,5-(iminomethano) - 10,11 - dihydro-5H-dibenzo [a,d]cyclohepten-5-ones, and substituting the ammonia by methylamine, dimethylamine, ethylamine, propylamine, benzylamine, p-chlorophenethylamine, pyrrolidine, piperidine, morpholine, or N'-ethylpiperazine, the 11-N-methyl, N,N-dimethyl, N-ethyl, N-propyl, N-benzyl, N-p-chlorophenethyl-carbamoyloxy-12-methyl, 12-ethyl, 12 - propyl, 12-butyl, 12-amyl, 12-allyl, 12-benzyl, 12-phenethyl, or 12-(3,4,5-trimethoxy)phenethyl - 10,5 - (iminomethano)-10,11-dihydro-5H-dibenzo[a,d]cyclohepten-5-ones are obtained, as well as the corresponding 11-pyrrolidino-, 11-piperidino-, 11-morpholino-, and 11 - N - ethylpiperazino carbonyloxy-12-methyl, 12-ethyl, 12-propyl, 12-butyl, 12-amyl, 12-allyl, 12-benzyl, 12-phenethyl, or 12-(3,4,5-trimethoxy)phenethyl-10,5-(iminomethano)-10,11 - dihydro-5H-dibenzo[a,d]cyclohepten-5-ones.

We claim:
1. A compound of the formula

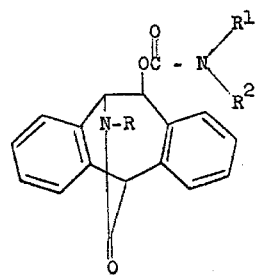

wherein R is selected from the group which consists of lower alkyl, allyl, benzyl, phenethyl, and (3,4,5-trimethoxy)phenethyl; and wherein R¹ and R² are selected from the group of paired radicals which consists of hydrogen and hydrogen; hydrogen and methyl; methyl and methyl; hydrogen and ethyl; hydrogen and propyl; hydrogen and benzyl; and hydrogen and p-chlorophenethyl; or wherein the grouping NR¹R² is a heterocyclic radical selected from the group which consists of pyrrolidino, piperidino, morpholine and N'-ethylpiperazine.

2. 11 - carbamoyloxy-12-methyl-10,5-(iminomethano)-10,11 - dihydro - 5H - dibenzo[a,d]cyclohepten-13-one, as claimed in claim 1.

3. 11 - phenoxycarbonyloxy - 12 - methyl-10,5(iminomethano)10,11 - dihydro-5H-dibenzo[a,d]cyclohepten-13-one.

References Cited

UNITED STATES PATENTS 3,412,085  11/1968  Dobson et al. _____ 260—239.3

OTHER REFERENCES

McLamore et al.: "J. Org. Chem.," vol. 20, pp. 1379–1382 (1955).

NORMA S. MILESTONE, Primary Examiner

R. T. BOND, Assistant Examiner

U.S. Cl. X.R.

424—244, 248, 250, 267, 274

PO-1050
(5/69)

UNITED STATES PATENT OFFICE
CERTIFICATE OF CORRECTION

Patent No. 3,509,134                Dated  April 28, 1970

Inventor(s) Martin A. Davis and Thomas A. Dobson

It is certified that error appears in the above-identified patent and that said Letters Patent are hereby corrected as shown below:

Column 1 line 20 "carbomayloxy" should read  .. carbamoyloxy ..

Column 2 line 55 "luter"         should read  .. lutea ..

Column 3 line 75 "elements"      should read  .. elemental ..

Formula III should be corrected:

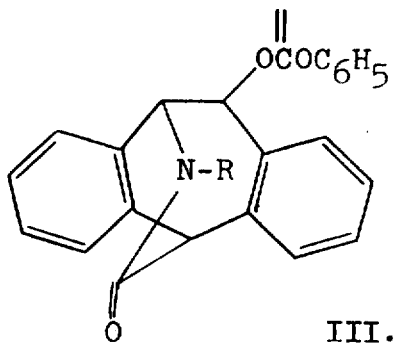  III.

should read

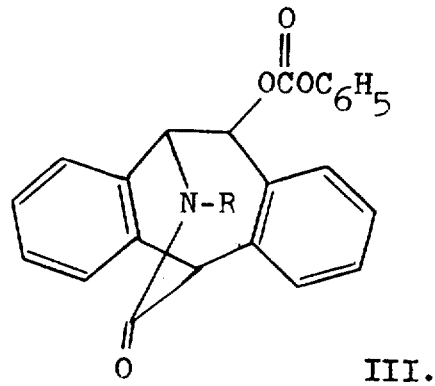  III.

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents